(No Model.)
E. ARMSTRONG.
BEE HIVE.
No. 330,365. Patented Nov. 17, 1885.
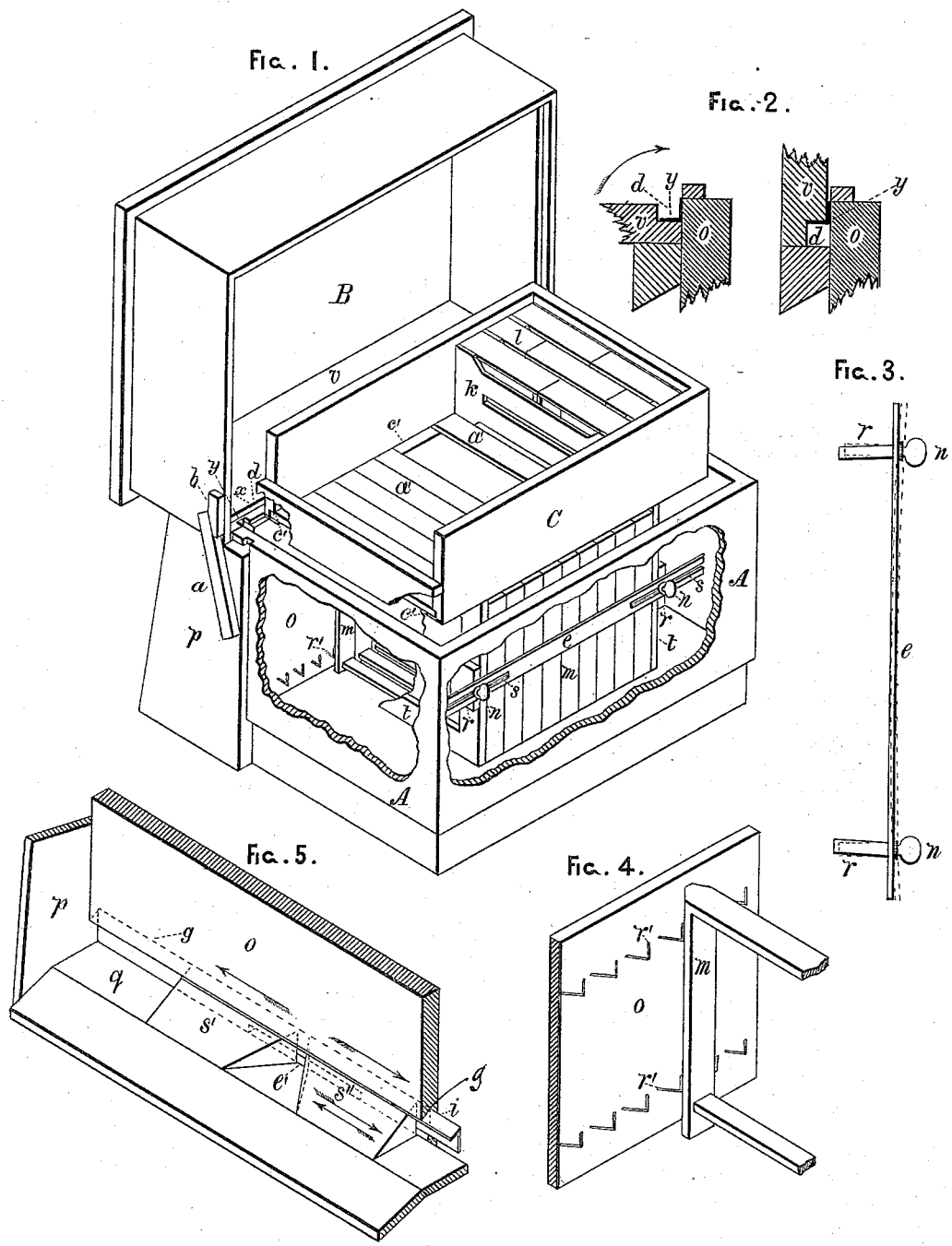
WITNESSES.
G. M. Terrell.
O. Hamilton.
INVENTOR.
Elvin Armstrong.
By F. S. Davenport, Atty.

UNITED STATES PATENT OFFICE.

ELVIN ARMSTRONG, OF JERSEYVILLE, ILLINOIS.

BEE-HIVE.

SPECIFICATION forming part of Letters Patent No. 330,365, dated November 17, 1885.

Application filed September 22, 1884. Serial No. 143,620. (No model.)

*To all whom it may concern:*

Be it known that I, ELVIN ARMSTRONG, of Jerseyville, in the county of Jersey and State of Illinois, have invented a new and Improved Bee-Hive; and I do hereby declare that the following is a full and exact description of the same, reference being had to the accompanying drawings, and to the letters of reference marked thereon.

Figure 1 is a perspective view of my hive with the cover raised, (certain parts being removed in order to show the internal construction.) Fig. 2 is a detail view showing the manner of supporting the cover. Fig. 3 is a view of the comb-frame clamp, and Figs. 4 and 5 are perspective views of certain details hereinafter described.

My invention relates to an improvement in bee-hives, the object of the same being, first, to provide the body of the hive with a cover adapted to be turned up into a vertical position as if hinged to the side of the hive, and yet admit of being readily removed altogether when so required; second, to provide the honey-rack with a bottom adapted to limit the admission of the bees to any required number of honey-boxes or to exclude them from any particular part of the honey-rack; third, to provide an improved adjustable clamp for holding the brood-frames together, which can be more readily removed and replaced than heretofore; fourth, to provide an adjustable entrance to the hive adapted to afford any required size of aperture and be easily removed from the center of the hive to either side.

With these ends in view my invention consists in certain details of construction and combinations of parts, as will be explained in the following specification and pointed out in the claims.

In Fig. 1, A represents the body of the hive; B, the cover; C, the honey-rack; *l*, the honey-boxes; *k*, the honey-box separators; *m*, the brood-frames; *e*, the clamp-bar, and *p* the side walls of the entrance-platform *q*. Secured to the wall *p* is a cleat, *a*, against the side of which butts the taper end of a cleat, *b*, attached to the lower edge of the end of the cover. In the lower edge of the side *v* of the cover is a rabbet, *d*, adapted as the hive is opened, and in consequence of the end of the cleat *b* butting against the side of the cleat *a*, to turn under a metallic flange, *y*, secured to the wall *o*. These details will be readily understood by reference to Fig. 2, in which is shown in section taken in the line *x*, Fig. 1, the two positions of the rabbet *d* with reference to the flange *y*. The honey-rack C is provided with a bottom composed of narrow slats *a'*, adapted to slide laterally in grooves *c'* in the lower part of the interior of the honey-rack, said slats being made of the same width as the honey-boxes, so as to admit the employment of separators *k* of the ordinary form. The bottom sides of the grooves *c'* are preferably made of tin, and project inward a little beyond the interior faces of the sides of the honey-rack, so as to form a ledge or rest for the separators. When it is required to exclude the bees from any part of the honey-rack, it is only necessary to bring the slats of such part close together after removing the separators from between them. It then follows that the bees are cut off from that part of the honey-rack in which the slats are in close proximity while they have the usual freedom of access to the other part.

The clamping device consists of a flexible bar, *e*, provided with longitudinal slots *s*, in which slide thumb-screws *n*, adapted to secure a pair of jaws, *r r*, any required distance apart, so as to impinge upon the outsides of the followers *t*. By reference to Fig. 3 it will be seen that the edges of the jaws *r* are slightly oblique to the inner faces thereof, so as to incline the latter to press mainly upon the interior parts of the followers, instead of upon the outer edges, causing them to lie snugly to the brood-frames. The oblong entrance *e'* in the wall *o* of the hive (see Fig. 5) is provided with two triangular movable blocks, *s' s''*, the block *s'* being adapted to slide longitudinally in a triangular metallic guide, *i*, which is also adapted to slide longitudinally in a groove, *g*, in the lower part of the wall *o*, the bases of said blocks resting upon the platform *q*. It will be observed that the block *s'* is immovable in the guide *i*, and that the block *s''* is free to slide therein.

Having fully described my invention, what I claim as new, and desire to secure by Letters Patent, is—

1. The combination, with the removable cover B, having the cleats *b* and rabbet *d*, of the hive-body provided with cleats *a*, and metallic flange, as and for the purpose set forth.

2. The honey-rack C, having grooved lower edges, *c'*, and a bottom composed of narrow slats *a'*, the ends of which are adapted to slide in grooves, in combination with the honey-boxes, which are of the same width as the slats, as and for the purpose set forth.

3. The comb-frame clamp, consisting of the flexible bar $e$, provided with slots $s$, thumb-screws $n$, and the inclined plates $r$, in combination with the followers $t$, as set forth.

4. The adjustable entrance, consisting of the wall having the groove $g$, the metallic guide $i$, adapted to slide in said groove, the block $s'$, secured to the guide $i$, and the block $s''$, free to slide in the guide, as set forth.

In testimony that I claim the foregoing I have hereunto set my hand this 26th day of August, 1884.

ELVIN ARMSTRONG.

Witnesses:
O. HAMILTON,
JOHN FOX.